US010122886B2

(12) United States Patent
Kohama

(10) Patent No.: US 10,122,886 B2
(45) Date of Patent: Nov. 6, 2018

(54) IMAGE READING DEVICE, IMAGE FORMING APPARATUS PROVIDED THEREWITH, AND METHOD FOR CONTROLLING IMAGE READING DEVICE

(71) Applicant: KYOCERA Document Solutions Inc., Osaka (JP)

(72) Inventor: Atsushi Kohama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 3 days.

(21) Appl. No.: 15/663,034

(22) Filed: Jul. 28, 2017

(65) Prior Publication Data

US 2018/0041657 A1    Feb. 8, 2018

(30) Foreign Application Priority Data

Aug. 5, 2016    (JP) ................. 2016-154724

(51) Int. Cl.
*H04N 1/00* (2006.01)
*H04N 1/04* (2006.01)
*H04N 1/193* (2006.01)
*H04N 1/053* (2006.01)
*H04N 1/10* (2006.01)

(52) U.S. Cl.
CPC ......... *H04N 1/053* (2013.01); *H04N 1/00018* (2013.01); *H04N 1/00037* (2013.01); *H04N 1/00058* (2013.01); *H04N 1/00082* (2013.01); *H04N 1/00798* (2013.01); *H04N 1/1026* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,537,225 A * | 7/1996 | Morikawa | ................ | B65H 1/06 358/475 |
| 6,204,865 B1 * | 3/2001 | Noguchi | ............ | G06K 15/1219 347/116 |
| 6,236,415 B1 * | 5/2001 | Nozaki | ................... | B41J 2/473 347/116 |
| 6,788,435 B2 * | 9/2004 | Ouchi | ................ | H04N 1/00002 358/474 |

(Continued)

FOREIGN PATENT DOCUMENTS

JP    2013-183232 A    9/2013

*Primary Examiner* — Madelein T Nguyen
(74) *Attorney, Agent, or Firm* — Stein IP, LLC

(57) ABSTRACT

An image reading device has a motor, an optical sensor (a light emitting portion, a light receiving portion), a carriage, a motor, a moving portion for rotating a belt, a pulse generating gear provided with a plurality of light shielding teeth along its circumference, and a control portion. The light shielding teeth of the pulse generating gear pass through a gap between the light emitting portion and the light receiving portion. First and second widths are set such that the movement amount of the pulse generating gear resulting from the motor rotating one step is equal to or larger than both the width of each of the light shielding teeth (first width) and the width of the interval between adjacent light shielding teeth (second width). The control portion recognizes when, during standby of the carriage, the level of an output signal changes.

9 Claims, 7 Drawing Sheets

(56) References Cited

U.S. PATENT DOCUMENTS

| | | | | |
|---|---|---|---|---|
| 9,565,331 B2* | 2/2017 | Higashitani | .......... | H04N 1/1065 |
| 2004/0100550 A1* | 5/2004 | Bannai | ................ | H04N 1/0473 |
| | | | | 347/232 |
| 2006/0245013 A1* | 11/2006 | Ikeno | ................ | H04N 1/00814 |
| | | | | 358/487 |
| 2006/0250661 A1* | 11/2006 | Susaki | .................. | H04N 1/401 |
| | | | | 358/461 |
| 2006/0268374 A1* | 11/2006 | Kim | .................. | G01D 5/34776 |
| | | | | 358/497 |
| 2007/0252890 A1* | 11/2007 | Kato | ........................ | B41J 2/473 |
| | | | | 347/241 |
| 2008/0074716 A1* | 3/2008 | Yoshihisa | .......... | H04N 1/00912 |
| | | | | 358/497 |
| 2008/0246976 A1* | 10/2008 | Kuwahara | ............ | H04N 1/2166 |
| | | | | 358/1.2 |
| 2011/0181918 A1* | 7/2011 | Motoyama | ........... | H04N 1/0057 |
| | | | | 358/404 |
| 2011/0235131 A1* | 9/2011 | Hanamoto | ......... | H04N 1/00519 |
| | | | | 358/474 |
| 2014/0092445 A1* | 4/2014 | Ishido | ................. | H04N 1/0071 |
| | | | | 358/483 |
| 2014/0184717 A1* | 7/2014 | Ishizaki | ............. | G03G 15/0189 |
| | | | | 347/118 |
| 2015/0281514 A1* | 10/2015 | Kita | .................. | H04N 1/00572 |
| | | | | 358/448 |
| 2016/0248932 A1* | 8/2016 | Horiguchi | ............ | H04N 1/0408 |
| 2017/0064127 A1* | 3/2017 | Tagawa | ................ | H04N 1/0464 |

* cited by examiner

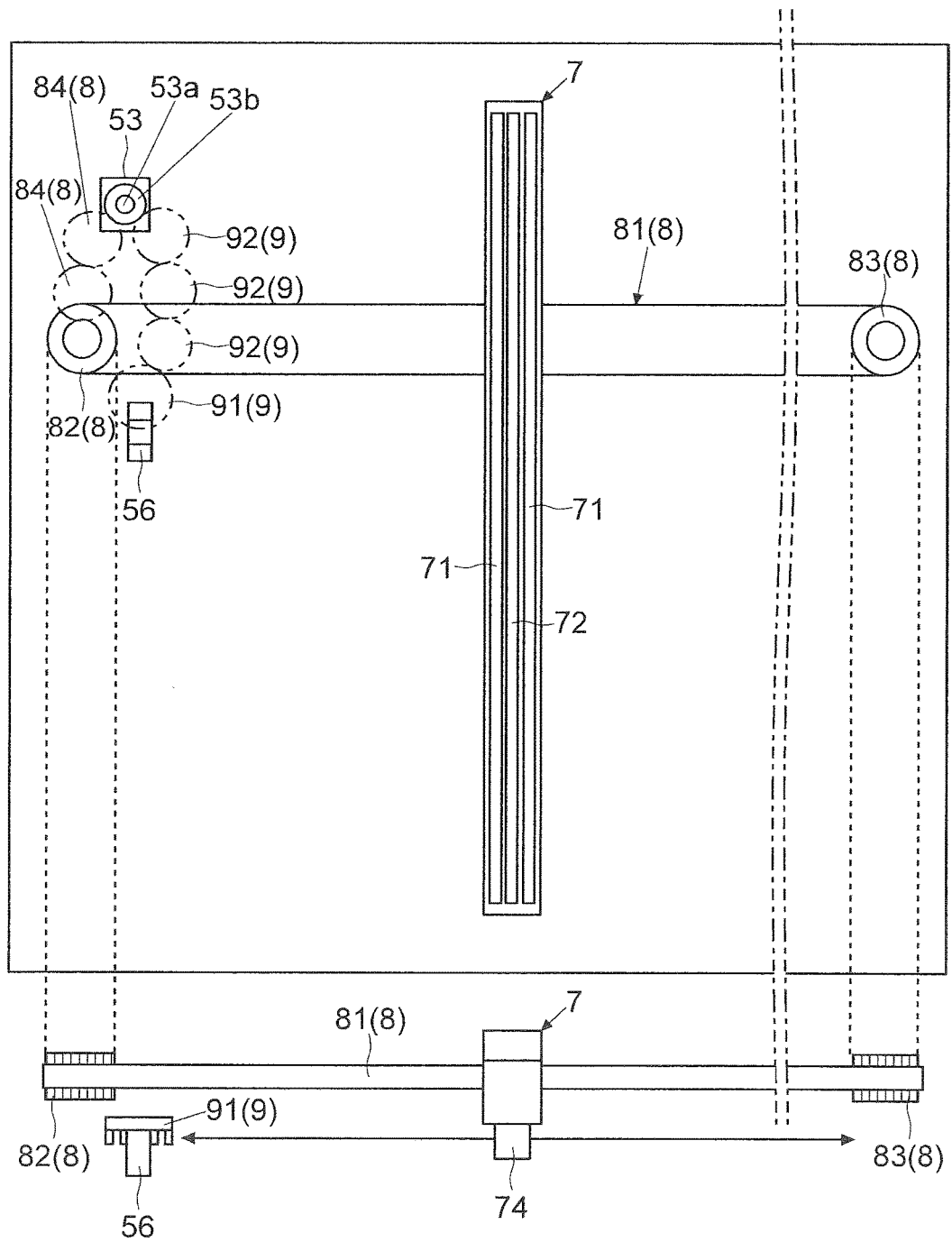

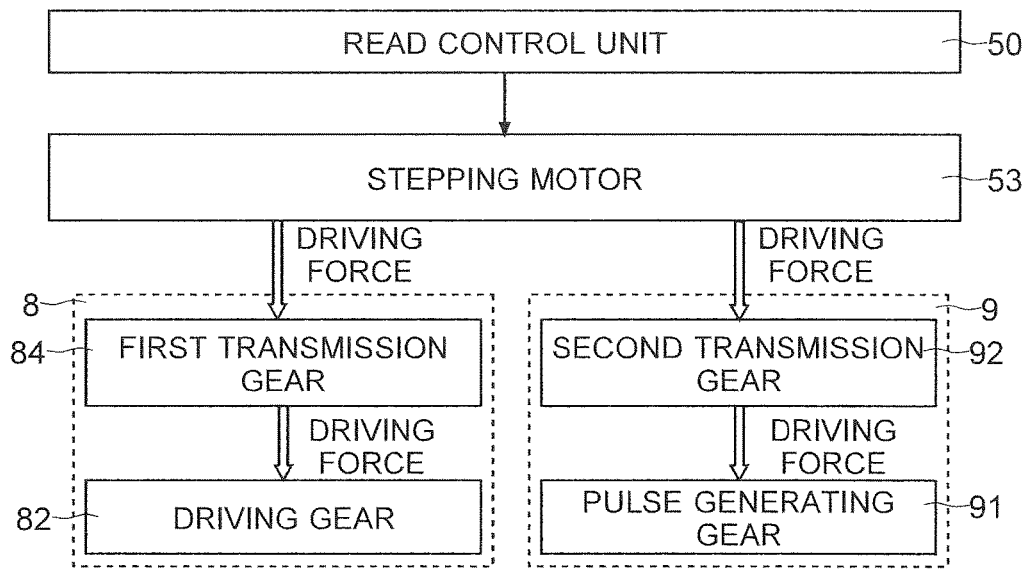
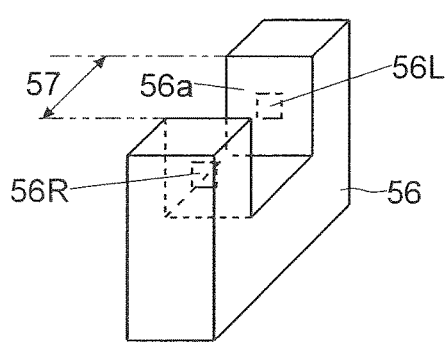
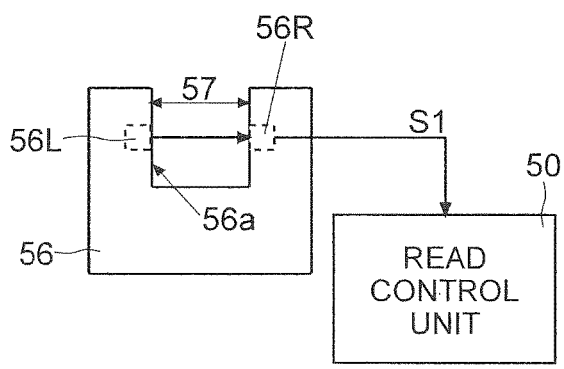
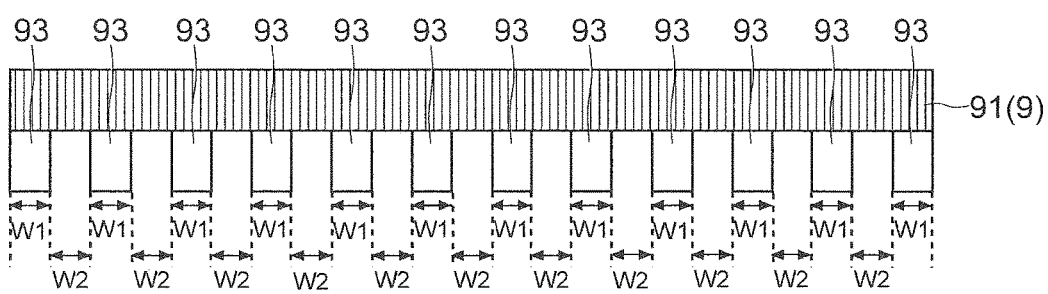

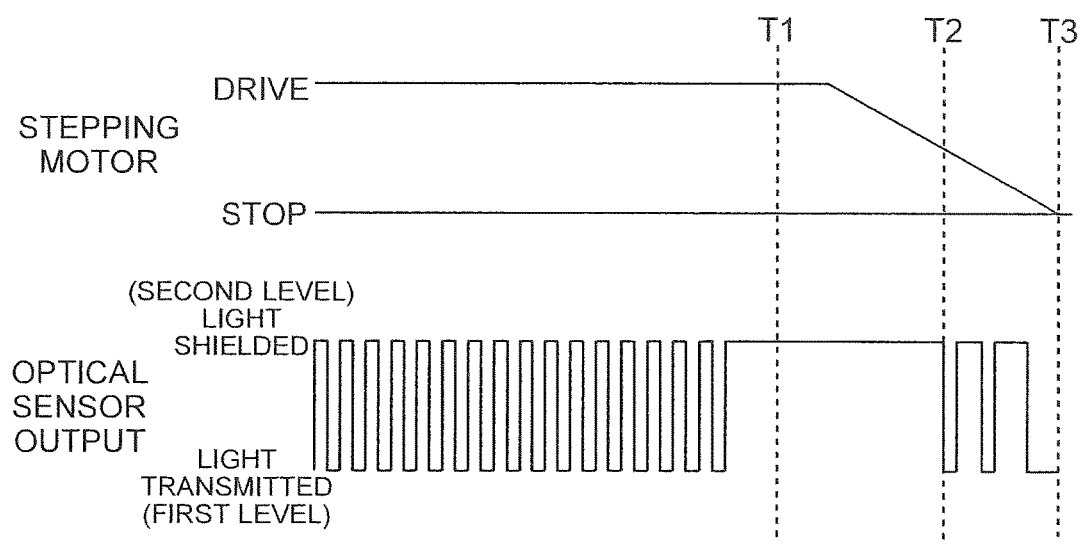

IMAGE READING DEVICE, IMAGE FORMING APPARATUS PROVIDED THEREWITH, AND METHOD FOR CONTROLLING IMAGE READING DEVICE

INCORPORATION BY REFERENCE

This application is based upon and claims the benefit of priority from the corresponding Japanese Patent Application No. 2016-154724 filed on Aug. 5, 2016, the entire contents of which are incorporated herein by reference.

BACKGROUND

The present disclosure relates to an image reading device that performs document reading, an image forming apparatus incorporating such an image reading device, and a method for controlling an image reading device.

Image reading devices read documents. Some image reading devices include a light source in a moving body that moves in the sub-scanning direction. Moving the moving body causes a read line (a position at which light illuminates) to move. In a standby state in which no reading is performed, the moving body is kept on standby at a predetermined standby position. When document reading is started, the moving body is moved from the standby position to a position at which document reading is performed. As to such movement of the moving body, the following technologies are known.

Specifically, an image reading device is known that can perform reading by a first reading method whereby an image of a document which is being moved is read with an exposing device arranged in a first position and by a second reading method whereby an image of a document is read by making the exposing device scan the document at rest. The image reading device includes a motor for moving the exposing device over the movement range from the first position to the scanning region by the second reading method, an optical sensor which is arranged between the first position and a second position arranged within the movement range and which has a light emitting element and a light receiving element, a shielding member which is arranged in the exposing device and which shields light from the light emitting element, and a light transmission portion which is arranged in the shielding member and which transmits light from the light emitting element. The image reading device moves the exposing device arranged on the second position side of the optical sensor toward the first position by controlling the motor, and stops the movement of the exposing device based on a first output value of the optical sensor resulting from a first position-side end part of the shielding member reaching the optical path of the optical sensor and a second output value of the optical sensor resulting from the light transmission portion reaching the optical path.

In the image reading device, when no document reading is performed, the moving body is located at a standby position (home position). For example, after the main power is turned on until reading starts, the position of the moving body is located at the standby position. After completion of document reading, the moving body is returned to the standby position. Until subsequent document reading starts, the moving member is kept on standby at the standby position. When document reading starts, the moving body is moved from the standby position to a position at which document reading can be performed (reading start position). After the movement, reading starts.

A deviation in the position of the moving body from the standby position causes a deviation in the document reading position (reading start position). This may affect the image data acquired by reading. As one way to avoid that, when the moving body is located at the standby position, the stepping motor that moves the moving body can be magnetically excited. A holding torque then prevents a deviation in the position of the moving body, but leads to increased power consumption by the stepping motor during standby of the moving body.

On the other hand, to save power, it is alternatively possible not to magnetically excite stepping motor in the standby state. However, in a magnetically unexcited state, the rotor tends to move. The moving body moves when the image reading device is acted on by a force from the outside or is shook. This may cause a variation in the rotation angle of the stepping motor.

Conventionally, there has been a problem that, when the moving body is located at the standby position, the movement of the moving body (the variation in the rotation direction of the stepping motor) is not accurately or precisely detected. Thus, after a standby state with no magnetic excitation, phase adjustment is performed before the rotation is started. Phase adjustment is a process of attracting the magnet of the rotor by magnetically exciting the motor. Phase adjustment is performed with consideration given to the possibility of the stepping motor going out of synchronism due to a variation in the rotation angle of the stepping motor on standby.

On the other hand, in detecting movement on the order of one step (one line), the width of one line is very small (with 600 dpi, 42.3 µm). Thus, when detection relies on alternately transmitting and shielding light with a slit, it is difficult to provide the slit having such a width accurately.

SUMMARY

According to one aspect of the present disclosure, an image reading device includes a stepping motor, an optical sensor, a carriage, a moving portion, a pulse generating mechanism, and a control portion. The optical sensor includes a light emitting portion and a light receiving portion. The light receiving portion is arranged at a distance from a light emission surface of the light emitting portion and outputs an output signal. The carriage includes at least a lamp which radiates light toward a document. The moving portion includes an endless belt, a driving gear, a driven gear, and a first transmission gear. Around the driving gear and the driven gear, the belt is wound. Via the first transmission gear, a drive of the stepping motor is transmitted to the driving gear to rotate the belt. The moving portion moves the carriage fitted to the belt in the sub-scanning direction by the rotation of the driving gear. The pulse generating mechanism includes a second transmission gear and a pulse generating gear. The second transmission gear meshes with a rotary shaft of the stepping motor or with one of the gears of the moving portion. The pulse generating gear rotates based on a driving force of the second transmission gear. The pulse generating gear is provided with a plurality of light shielding teeth along its circumferential. The control portion controls rotation and magnetic excitation of the stepping motor and receives the output signal. The light receiving portion outputs the output signal at a first level when light from the light emitting portion is not intercepted. The light receiving portion outputs the output signal at a second level when the light is intercepted. The carriage is provided with a light shielding plate which passes through a gap between the light emitting portion and the light receiving portion, and which while passing therethrough, shields the optical path from the light emitting portion to the light receiving portion. The light shielding teeth of the pulse generating gear pass through the gap. The pulse generating gear is arranged at a position at which the pulse generating gear, while rotating, alternately transmits and intercepts light along the optical path with the light shielding teeth. A first width and a second width are set such that a movement amount of the pulse generating gear resulting from the stepping motor rotating one step is equal to or larger than both the first width and the second width. The first width is a width of each of the light shielding teeth in a rotation direction of the pulse generating gear. The second width is a width of an interval between adjacent light shielding teeth in the rotation direction of the pulse generating gear. The control portion keeps the carriage on standby at a home position which is a position at which the light shielding plate does not shield the optical path. The control portion recognizes a deviation in a position of the carriage when, during standby of the carriage at the home position, the level of the output signal changes. The control portion determines whether or not phase adjustment of the stepping motor is required based on the recognition.

Further features and advantages of the present disclosure will become apparent from the description of embodiments given below.

BRIEF DESCRIPTION OF THE DRAWINGS

FIG. 4 is a diagram showing an example of movement of a carriage in the image reading device according to the embodiment;

FIG. 5 is a diagram showing an example of transmission of a drive of a stepping motor according to the embodiment;

FIG. 6A is a perspective view showing an example of an optical sensor according to the embodiment; FIG. 6B is a front view showing an example of the optical sensor according to the embodiment;

FIG. 7 is a partly developed view of a circumferential part of a pulse generating gear according to the embodiment;

FIG. 8 is a timing chart showing an example of a flow of a case in which the carriage according to the embodiment is stopped at a home position.

DETAILED DESCRIPTION

The present disclosure detects a deviation in the position of a carriage in a standby state. The precision is equal to or smaller than the amount of movement of the carriage corresponding to one step. Hereinafter, an embodiment of the present disclosure will be described with reference to FIGS. 1 to 7. As an example, a multifunction peripheral 100 (corresponding to an image forming apparatus) incorporating an image reading device 1 will be described. All features, such as structures and arrangements, described in connection with the embodiment are merely examples for the sake of description, and are in no way meant to limit the scope of the disclosure.

Figure 1:
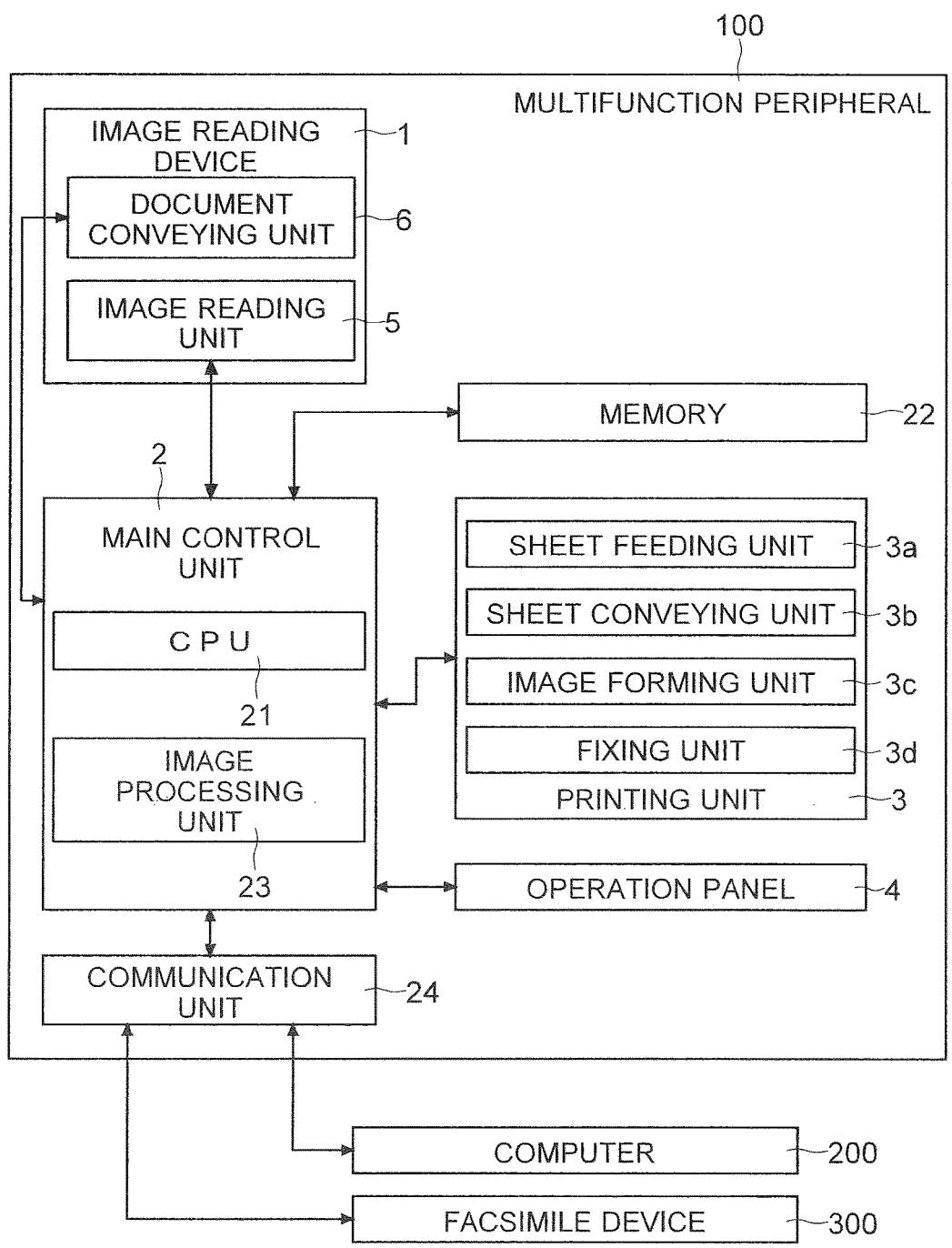
FIG. 1 is a diagram showing an example of a multifunction peripheral according to one embodiment.

Multifunction Peripheral 100:

With reference to FIG. 1, the multifunction peripheral 100 according to the embodiment will be described. As shown in FIG. 1, the multifunction peripheral 100 includes an image reading device 1. The multifunction peripheral 100 further includes a main control unit 2, a printing unit 3, and an operation panel 4. The printing unit 3 includes a sheet feeding unit 3a, a sheet conveying unit 3b, an image forming unit 3c, and a fixing unit 3d. The image reading device 1 includes an image reading unit 5 and a document conveying unit 6. The image reading device 1 will be described in detail later.

The main control unit 2 controls the entire multifunction peripheral 100. The main control unit 2 includes a CPU 21. In the multifunction peripheral 100, a memory 22 is provided. The memory 22 includes non-volatile and volatile storage devices. For example, the memory 22 includes ROM, a HDD, flash ROM, and RAM. The memory 22 stores programs and data for control. The main control unit 2 controls relevant blocks as mentioned above by use of the programs and data in the memory 22. The main control unit 2 makes relevant blocks execute various jobs. Jobs such as scanning, printing, transmission, and image data storage can be executed. In the main control unit 2, an image processing unit 23 is provided. The image processing unit 23 performs image processing based on image data fed from the image reading device 1 (the image reading unit 5).

In a print job, the main control unit 2 makes the sheet feeding unit 3a feed a sheet. The main control unit 2 makes the sheet conveying unit 3b convey a sheet. The sheet conveying unit 3b discharges a sheet having undergone printing out of the apparatus. The main control unit 2 makes the image forming unit 3c form a toner image based on image data. The main control unit 2 makes the image forming unit 3c transfer a toner image to a sheet which is conveyed. The main control unit 2 makes the fixing unit 3d fix a toner image transferred to a sheet to the sheet. The main control unit 2 controls the operation of the printing unit 3.

The operation panel 4 includes a display panel, a touch panel, and hardware keys. The display panel displays the status of the multifunction peripheral 100, various messages, and setting screens. The touch panel and the hardware keys accept settings and operations related to jobs such as scanning and copying. The main control unit 2 communicates with the operation panel 4 and recognizes the content of the settings. The main control unit 2 makes the image reading device 1 and the printing unit 3 execute jobs according to the settings.

The multifunction peripheral 100 includes a communication unit 24. The communication unit 24 is communicably connected to a computer 200 or a facsimile device 300 via a network, a cable, or a public line. The computer 200 is, for example, a PC or a server. The communication unit 24 can transmit image data based on document reading to the computer 200 or to the facsimile device 300 (a scan transmission function).

Figure 2:
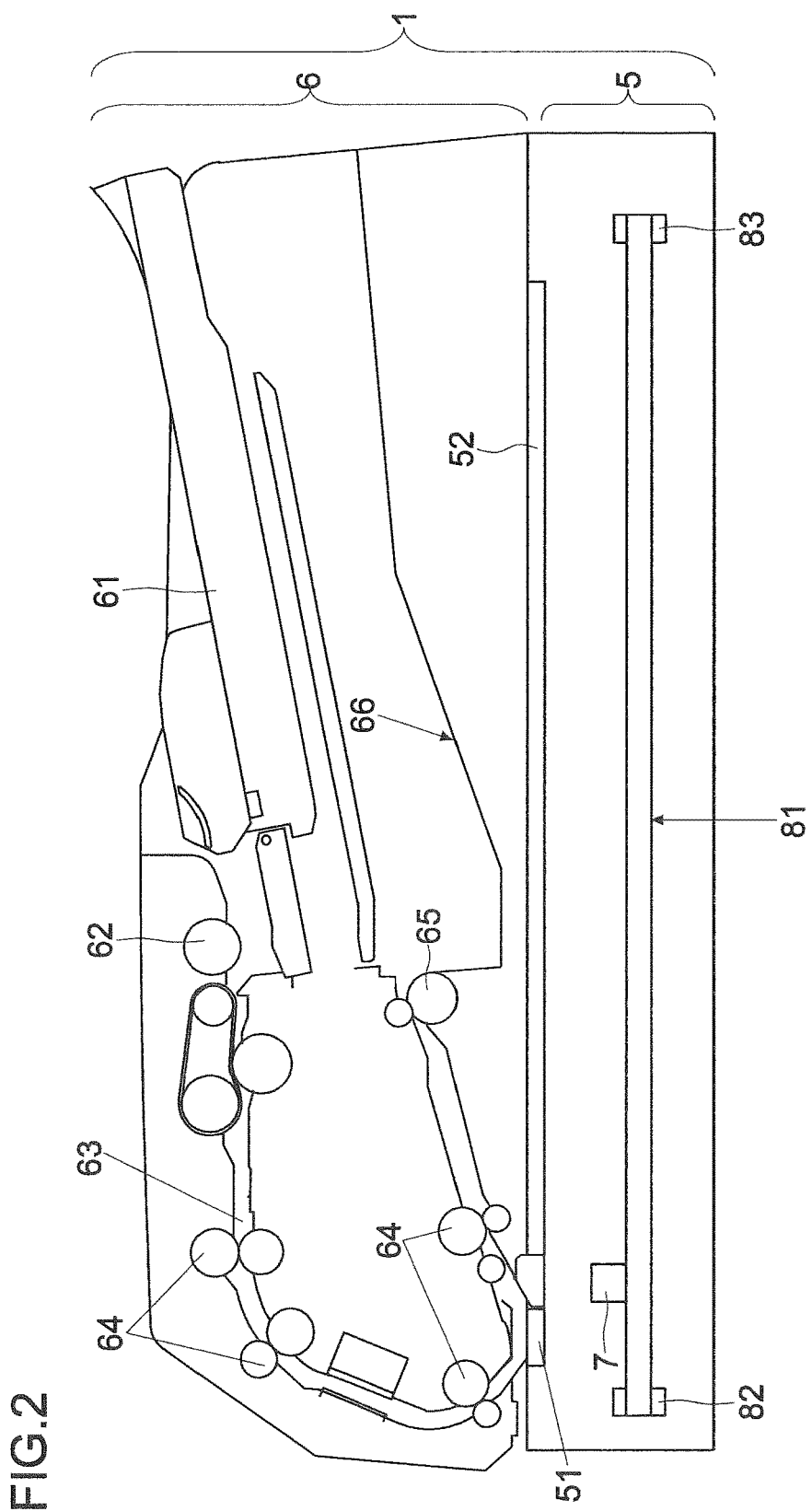
FIG. 2 is a diagram showing an example of an image reading device according to the embodiment.

Image Reading Device 1:

Next, with reference to FIGS. 1 to 3, the image reading device 1 according to the embodiment will be described. As shown in FIG. 2, the document conveying unit 6 is arranged over the image reading unit 5. The document conveying unit 6 conveys a document placed on it toward a feed-reading contact glass 51 (a reading position). The document conveying unit 6 opens and closes in the up/down direction with respect to the image reading unit 5. The document conveying unit 6 functions as a cover which holds a document from above. In the document conveying unit 6, there are arranged, in order from the upstream side in the conveyance direction, a document tray 61, a document feeding roller 62, a document conveyance passage 63, a plurality of document conveying roller pairs 64, a document discharge roller pair 65, and a document discharge tray 66.

Figure 3:
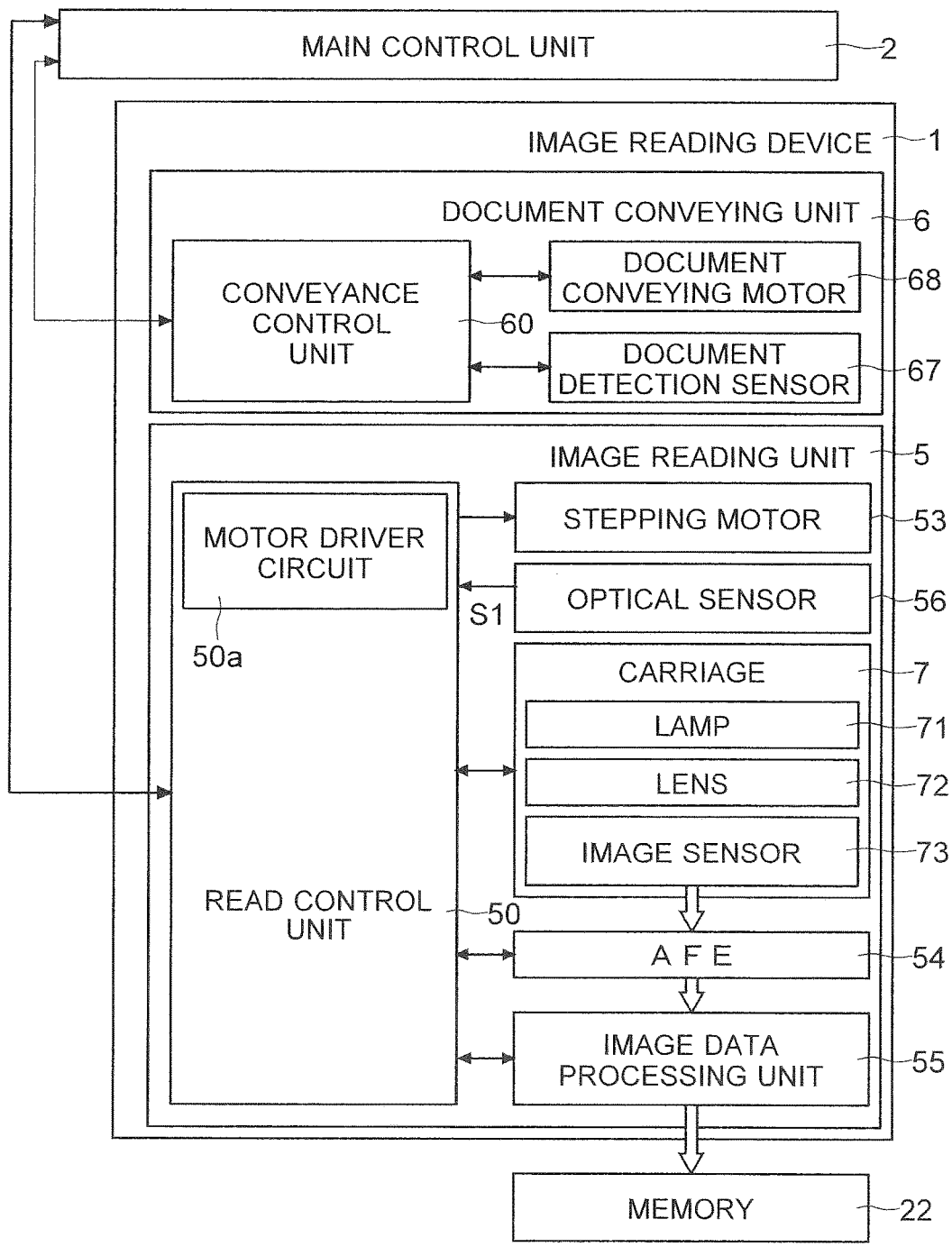
FIG. 3 is a diagram showing an example of the image reading device according to the embodiment.

As shown in FIG. 3, the document conveying unit 6 includes a conveyance control unit 60 which controls the operation of the document conveying unit 6. The conveyance control unit 60 is a circuit board which includes a CPU and a memory. The memory stores programs and data for control. The conveyance control unit 60 is communicably connected to the main control unit 2 and a read control unit 50. The conveyance control unit 60 accepts an instruction to start document conveying from the control main portion 2 or the read control unit 50. The conveyance control unit 60 controls operation for conveying a document in the document conveying unit 6.

In the document conveying unit 6, a document detection sensor 67 is provided. The document detection sensor 67 detects whether or not there is a sheet on the document tray 61. When an instruction to execute a job to perform document reading is given on the operation panel 4, the main control unit 2 transmits an instruction to read a document to the conveyance control unit 60. The conveyance control unit 60 checks the output of the document detection sensor 67. Thereby, the conveyance control unit 60 detects whether or not there is a sheet on the document tray 61. When a document is present on the document tray 61, the conveyance control unit 60 drives a document conveying motor 68. Thereby, the conveyance control unit 60 rotates the document feeding roller 62 and the document conveying roller pairs 64. The document feeding roller 62 and the document conveying roller pairs 64 convey the document toward the reading position. The document passes across the feed-reading contact glass 51 arranged on the top surface of the image reading unit 5. During this passage, the image reading unit 5 reads the surface of the document.

As shown in FIG. 2, the image reading unit 5 has a housing. In a left part of the top surface of the image reading unit 5, the transparent plate-shaped feed-reading contact glass 51 is arranged. On the top surface of the image reading unit 5, on the right side of the feed-reading contact glass 51, a transparent plate-shaped placement-reading contact glass 52 is arranged. The image reading unit 5 radiates light toward a document that passes, while being conveyed by the document conveying unit 6, over the feed-reading contact glass 51. The image reading unit 5 reads the conveyed document based on reflection, and generates image data (feed reading). The image reading unit 5 radiates light toward a document placed on the placement-reading contact glass 52. The image reading unit 5 reads the placed document based on reflection, and generates image data (placement reading).

In the image reading unit 5, the read control unit 50 is provided. The read control unit 50 controls the operation of the image reading unit 5. The read control unit 50 is a circuit board which includes a CPU, a memory, and an integrated circuit. Based on an instruction or a signal from the main control unit 2, the read control unit 50 reads a document. Instead of the read control unit 50 being provided, the main control unit 2 may control and manage the image reading unit 5.

As shown in FIG. 2, the image reading unit 5 includes, in the housing, a carriage 7 and a belt 81. The belt 81 is endless. The belt 81 is wound around a driving gear 82 and a driven gear 83. A stepping motor 53 (see FIG. 3) rotates the belt 81. The stepping motor 53 is rotatable in the forward and reverse directions. The carriage 7 is fitted to the belt 81. As the belt 81 rotates, the carriage 7 moves in the sub-scanning direction.

In the image reading unit 5, the carriage 7, an AFE 54 (analog front end), and an image data processing unit 55 are provided. The carriage 7 is a unit which reads a document by the CIS method. The carriage 7 includes a lamp 71, a lens 72, and an image sensor 73. Although the present description deals with an example in which the image reading device 1 reads a document by the CIS method, instead the image reading device 1 may read a document by the CCD method. For the CCD method, in the carriage 7, a lamp 71 and a mirror are provided. A lens and an image sensor are fixed outside the carriage 7. The light reflected from the document is directed, by the mirror, into the lens and then to the image sensor.

The lamp 71 is a light source such as an LED. The lamp 71 radiates light toward a document along the main scanning direction. In document reading, the read control unit 50 turns on the lamp 71. When document reading ends, the read control unit 50 turns off the lamp 71.

The image sensor 73 is a line sensor in which light-receiving elements are arranged along the main scanning direction. The image sensor 73 may be a color sensor that includes line sensors of a plurality of colors. The image sensor 73 may be a monochrome sensor that includes line sensors for white and black reading alone. The lens 72 directs the light reflected from the document to the light-receiving elements of the image sensor 73.

By a cable (unillustrated), the carriage 7 (image sensor 73) is electrically connected to the AFE 54. The AFE 54 includes various circuits such as a noise elimination circuit, an offset circuit, an amplification circuit, and an A/D conversion circuit. The AFE 54 is a circuit that processes analog signals of the light-receiving elements fed out from the image sensor 73, and converts them into digital values.

The image data processing unit 55 processes the pixel values of pixels generated in the AFE 54. The image data processing unit 55 corrects distortion due to the reading characteristics of the image reading unit 5 (image sensor 73), and generates image data of the document. The image data processing unit 55 performs, for example, shading correction and gamma correction. The generated image data is fed to the memory 22. The image data of the document is used for jobs such as printing and transmission.

Movement of Carriage 7:

Next, with reference to FIGS. 4 and 5, an example of the movement of the carriage 7 in the image reading device 1 according to the embodiment will be described.

FIG. 4 is a diagram showing the image reading unit 5 as seen from above. In FIG. 4, a top surface part of the image reading unit 5 is intentionally omitted from illustration. Accordingly, the placement-reading contact glass 52, the feed-reading contact glass 51, etc. are not illustrated. The inside of the image reading unit 5 is illustrated.

As shown in FIG. 4, the carriage 7 includes the lamp 71 which radiates light toward a document. FIG. 4 shows an example in which two lamps 71 are provided. FIG. 4 also shows an example in which a lens 72 (rod lens array) is provided between the lamps 71. The lens 72 directs the light reflected from the document to the image sensor 73. Under the lens 72, the image sensor 73 is arranged.

In the image reading unit 5, the stepping motor 53 is provided. Based on the driving force of the stepping motor 53, a moving portion 8 moves the carriage 7. The moving portion 8 comprises the belt 81, the driving gear 82, the driven gear 83, and first transmission gears 84. As shown in FIG. 5, the drive of the stepping motor 53 is transmitted via the first transmission gears 84 to the driving gear 82. The belt 81 is wound around the driving gear 82 and the driven gear 83. The carriage 7 is connected to one side of the belt 81 which it faces.

The read control unit 50 controls the rotation of the stepping motor 53. For example, the read control unit 50 includes a motor driver circuit 50a (see FIG. 3) which controls the rotation of the stepping motor 53. As the stepping motor 53 rotates, the driving gear 82 rotates. As the driving gear 82 rotates, the belt 81 rotates. As the belt 81 rotates, the carriage 7 moves together.

The carriage 7 has a home position (standby position). The home position will be described in detail later. In placement reading, the read control unit 50 rotates the stepping motor 53. Thereby, the read control unit 50 moves the carriage 7 in the horizontal direction (sub-scanning direction). After completion of placement document reading, the read control unit 50 returns the carriage 7 to the home position. In feed reading, the read control unit 50 keeps the carriage 7 stationary under the feed-reading contact glass 51. After completion of feed reading, the read control unit 50 returns the carriage 7 to the home position.

As shown in FIG. 4, a plurality of first transmission gears 84 may be provided. One of the first transmission gears 84 meshes with a motor gear 53b. The motor gear 53b is fitted around a rotary shaft 53a of the stepping motor 53. Another one of the plurality of first transmission gears 84 meshes with the driving gear 82. Thus, the drive of the stepping motor 53 can be transmitted via a plurality of gears to the driving gear 82.

The numbers of cogs of the first transmission gears 84 and the driving gear 82 are set such that the carriage 7 moves one line in the sub-scanning direction when the stepping motor 53 is rotated one step. In other words, the gear ratio of the first transmission gears 84 and the driving gear 82 is adjusted such that the carriage 7 moves one line when the stepping motor 53 is rotated one step. With 600 dpi, the width of one line is 42.3 μm. When the width of one line is small relative to the rotation amount of the motor gear 53b corresponding to one step of the stepping motor 53, it is necessary to reduce the rotation angle for one step. In this case, the number of cogs is increased toward the last stage (the driving gear 82). Thus, every time the read control unit 50 inputs one pulse to the stepping motor 53, the read control unit 50 can move the carriage 7 one line in the sub-scanning direction.

Optical Sensor 56 and Pulse Generating Mechanism 9:

With reference to FIGS. 4 to 7, an optical sensor 56 and a pulse generating mechanism 9 according to the embodiment will be described. As shown in FIG. 4, in the image reading unit 5, an optical sensor 56 is provided. As shown in FIG. 6, the optical sensor 56 is a transmissive optical sensor. The optical sensor 56 is substantially U-shaped. The optical sensor 56 includes inside it a light emitting portion 56L and a light receiving portion 56R. For example, the light emitting portion 56L is a semiconductor laser device. The light receiving portion 56R is a photodiode.

The light receiving portion 56R is arranged opposite a light emission surface 56a of the light emitting portion 56L. Between the light emitting portion 56L and the light receiving portion 56R, a gap 57 is provided. The light emitting portion 56L radiates light toward the light receiving portion 56R. When the light from the light emitting portion 56L is not intercepted (in a light-receiving state), the light receiving portion 56R outputs a first level (for example, Low level). On the other hand, when the light from the light emitting portion 56L is intercepted (in a light-shielded state), the right receiving portion 56R outputs a second level (for example, High level). The optical sensor 56 outputs different levels when the optical path is shielded and when it is not shielded.

As shown in FIG. 4, in the carriage 7, a light shielding plate 74 is provided. The light shielding plate 74 is arranged at such a position as to pass through the gap 57 between the light emitting portion 56L and the light receiving portion 56R of the optical sensor 56. When the carriage 7 is moved toward the installation position of the optical sensor 56, the light shielding plate 74 passes through the gap 57. Thereby, the light shielding plate 74 shields the optical path from the light emitting portion 56L to the light receiving portion 56R. The output of the optical sensor 56 is fed to the read control unit 50 (see FIG. 3).

Taken as the home position of the carriage 7 is a position at which the light shielding plate 74 does not shield the optical path. To move the carriage 7 to the home position so as to keep it on standby, the read control unit 50 moves the carriage 7 toward the optical sensor 56. When the carriage 7 reaches the installation position of the optical sensor 56, the light shielding plate 74 of the carriage 7 shields the optical path. The light shielding plate 74 turns the output of the light receiving portion 56R to the second level. The light shielding plate 74 has a width of two or more lines (for example, one to several centimeters) in the sub-scanning direction. As long as the carriage 7 continues to move, the light shielding plate 74 keeps the output signal S1 of the light receiving portion 56R at the second level through a plurality of steps.

When the output signal S1 of the optical sensor 56 (the light receiving portion 56R) is kept at the second level for a predetermined time, the read control unit 50 recognizes that the carriage 7 has reached the installation position of the optical sensor 56. The predetermined time is equal to or longer than the time corresponding to two steps but less than the time required to move over the width (length) of the light shielding plate 74. After recognizing the arrival, the read control unit 50 moves the carriage 7 to a position (home position) at which the light shielding plate 74 does not shield the optical path. More specifically, the read control unit 50 recognizes that the output signal S1 has been kept at the second level for the predetermined time. Then, after recognizing the second level to have been kept, the read control unit 50 moves the carriage 7 a predetermined number of steps. Taken as the predetermined number of steps is a value equal to or larger than the sum of the number of steps to be moved until the light shielding plate 74 stops shielding the optical path and the number of steps required to move the carriage 7 away from the optical sensor 56 so that, even when the carriage 7 moves a little from a state where the light shielding plate 74 has stopped shielding the optical path, the light shielding plate 74 does not shield the optical path. After the movement corresponding to the predetermined number of steps (when the position of the carriage 7 reaches the home position), the read control unit 50 stops the carriage 7. The carriage 7 is now at the home position in a standby state.

The image reading device 1 detects the movement of the carriage 7 in the standby state in units of steps. To achieve that, a pulse generating mechanism 9 is provided in the image reading device 1. The pulse generating mechanism 9 includes a pulse generating gear 91 and second transmission gears 92. As shown in FIG. 5, the drive of the stepping motor 53 is transmitted via the second transmission gears 92 to the pulse generating gear 91. As the stepping motor 53 rotates, the pulse generating gear 91 rotates.

As shown in FIG. 4, a plurality of second transmission gears 92 may be provided. One of the second transmission gears 92 meshes with the motor gear 53b. Another one of second transmission gears 92 may mesh with one of the first transmission gears 84. Thus, the driving force of the stepping motor 53 is transmitted via a plurality of gears (second transmission gears 92) to the pulse generating gear 91.

As shown in FIGS. 4 and 7, the pulse generating gear 91 is provided with a plurality of light shielding teeth 93 along its circumference. In other words, the light shielding teeth 93 in the shape of comb teeth are arranged on the pulse generating gear 91. FIG. 7 shows an example of a developed view of a part of the whole of a circumferential part of the pulse generating gear 91. As shown in FIG. 7, an upper part of the pulse generating gear 91 is a cog part which meshes with the second transmission gear 92. As shown in FIG. 7, the shielding teeth 93 are arranged to extend downward. The light shielding teeth 93 have an equal width (first width W1) in the rotation direction (circumferential direction) of the pulse generating gear 91. In other words, variations in the first widths W1 fall within a permissible range.

The pulse generating gear 91 is arranged over the optical sensor 56. The pulse generating gear 91 is arranged such that the light shielding teeth 93 pointing downward passes through the gap 57 (between the light emitting portion 56L and the light receiving portion 56R) in the optical sensor 56. By the pulse generating gear 91 rotating, the light along the optical path is alternately intercepted and unintercepted by the light shielding teeth 93. As a result, the level of the output signal S1 changes according to whether or not the light is intercepted. The light shielding plate 74 is fitted to the carriage 7 so as not to collide with the light shielding teeth 93 (pulse generating gear 91).

The first width W1 and a second width W2 are set such that the movement amount (rotation amount) of the pulse generating gear 91 resulting from the stepping motor 53 rotating one step is equal to or larger than the first width W1 and the second width W2. The first width W1 is the width of each of the light shielding teeth 93 in the rotation direction of the pulse generating gear 91. The second width W2 is the width of the interval between adjacent light shielding teeth 93 in the rotation direction of the pulse generating gear 91. The numbers of cogs of the second transmission gears 92 and the pulse generating gear 91 are set such that, when the stepping motor 53 is rotated one step, the movement amount of the pulse generating gear 91 in the rotation direction is equal to or larger than the first width W1 (see FIG. 7) and the second width W2 (see FIG. 7). In other words, the gear ratio of the second transmission gears 92 and the pulse generating gear 91 is adjusted such that, when the stepping motor 53 rotates one step, the level of the output signal S1 changes once or a plurality of times. When the first width W1 and the second width W2 are larger than the rotation amount of the motor gear 53b corresponding to one step of the stepping motor 53, the number of cogs are reduced toward the last stage (the pulse generating gear 91). The purpose is to increase the rotation angle for one step.

More specifically, in the image reading device 1, the first width W1 and the second width W2 are equal. The light shielding teeth 93 are formed such that the first width W1 and the second width W2 are equal (such that variations fall within the permissive range). That is, the first width W1, the second width W2, and the numbers of cogs of the second transmission gears 92 and the pulse generating gear 91 are set such that, when the stepping motor 53 is rotated one step, the movement amount of the pulse generating gear 91 in the rotation direction is equal to the first width W1 and the second width W2. Thus, when the carriage 7 moves one line corresponding to one step of the stepping motor 53, the output signal S1 of the light receiving portion 56R changes once.

Stopping Carriage 7 at Home Position:

Next, with reference to FIG. 8, an example of the flow of operation for stopping the carriage 7 according to the embodiment at the home position will be described. In the image reading device 1, after the device is started until it actually starts to read, the read control unit 50 keeps the carriage 7 on standby at the home position. Also, after a scan is completed until a subsequent scan is started, the read control unit 50 keeps the carriage 7 on standby at the home position.

Now, a description will be given of a case where the optical sensor 56 is arranged between the placement-reading contact glass 52 and the feed-reading contact glass 51. Also a description will be given of a case where the home position is a position at which the first line (an edge) of the placement-reading contact glass 52 and a read line coincide with each other.

With reference to FIG. 8, the movement of the carriage 7 to the home position when feed reading is performed will be described. When feed reading is performed, the read control unit 50 moves the carriage 7 to under the feed-reading contact glass 51 (to the left side of the optical sensor 56). After completion of feed reading, the read control unit 50 moves the carriage 7 from a feed-reading contact glass 51 side toward the optical sensor 56. When the light shielding plate 74 does not shield the optical path, as shown in FIG. 8, the light shielding teeth 93 of the pulse generating gear 91 switch the level of the output signal S1 of the light receiving portion 56R in units of steps (lines).

Shortly, the light shielding plate 74 of the carriage 7 shields the optical path. With the light intercepted by the light shielding plate 74, the read control unit 50 recognizes that the level of the output signal S1 is kept at the second level (High level) for a predetermined time (at time point T1 in FIG. 8). In the example shown in FIG. 8, the predetermined time is, for example, a time corresponding to two to three steps.

After the recognition, the read control unit 50 moves the carriage 7 a predetermined number of steps. Thereafter, the read control unit 50 stops the stepping motor 53 (at time point T3 in FIG. 8). In this case, the predetermined number of steps is the number of steps required to move the carriage 7 from the position at the time point T1 of the recognition to a home position. The home position is a position at which the light shielding plate 74 does not shield the optical path of the optical sensor 56. While the carriage 7 is being moved the predetermined number of steps, the light shielding plate 74 passes out of the optical path. At the time point of completion of passage (time point T2 in FIG. 8), the level of the output signal S1 recovers the waveform that changes with each step. In other words, the read control unit 50 stops the stepping motor 53 after the light shielding plate 74 has passed out of the optical path and the output signal S1 has started to change in the shape of pulses.

In placement reading, the read control unit 50 moves the carriage 7 under the placement-reading contact glass 52 (in the sub-scanning direction), unlike in feed reading. After completion of placement reading, the read control unit 50 moves the carriage 7 from the right side of the multifunction peripheral 100 (a the placement-reading contact glass 52 side) toward the optical sensor 56. By the light shielding plate 74 shielding the optical path, the level of the output signal S1 is kept at the second level (High level) for a predetermined time. After recognizing this to have been kept, the read control unit 50 stops the stepping motor 53 temporarily. Then, the read control unit 50 moves the carriage 7 a predetermined number of steps toward the placement-reading contact glass 52. Thereafter, the read control unit 50 stops the stepping motor 53. In this case, the predetermined number of steps is the number of steps required to move the carriage 7 over the distance from the temporary stop position to the home position. Also in placement reading, the read control unit 50 stops the stepping motor 53 after the light shielding plate 74 has passed out of the optical path and the output signal S1 has started to change in the shape of pulses.

Figure 9:
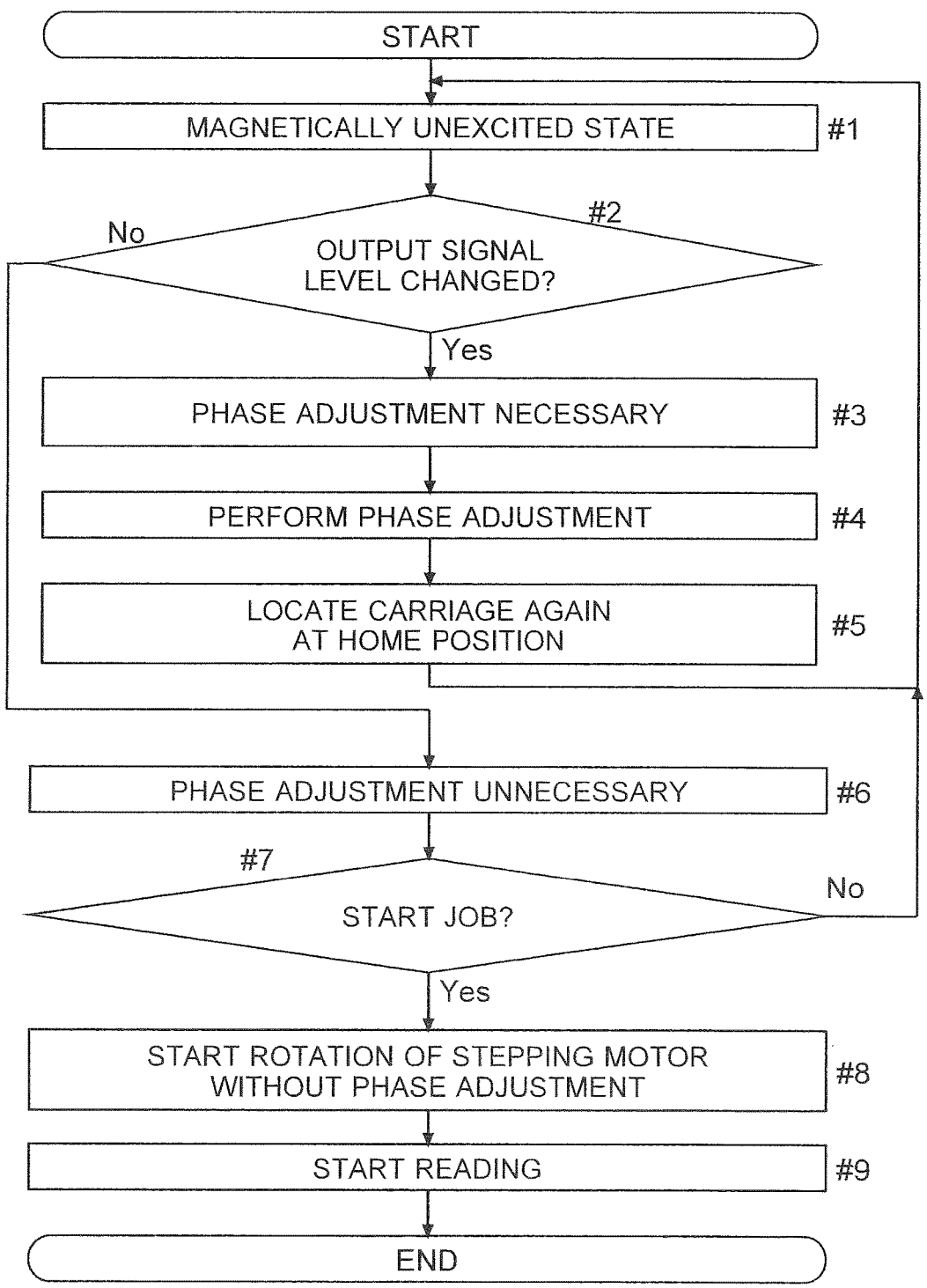
FIG. 9 is a flow chart showing an example of a flow of detection of the movement of the carriage at rest in the image reading device according to the embodiment.

Detection of Movement of Carriage 7 at Rest:

Next, with reference to FIG. 9, a description will be given of an example of the flow of operation for detecting the movement of the carriage 7 at rest in the image reading device 1 according to the embodiment. The flow in FIG. 9 starts when the carriage 7 is stopped at the home position. In other words, it starts when the read control unit 50 stops the stepping motor 53 such that the carriage 7 is located at the home position.

First, the read control unit 50 brings the stepping motor 53 into a magnetically unexcited state (Step #1). This helps reduce power consumption due to magnetic excitation at rest. Then, the read control unit 50 checks the output signal S1 of the optical sensor 56. The read control unit 50 checks whether or not the level of the output signal S1 has changed (whether or not the carriage 7 has moved) (Step #2). The carriage 7 moves when a force from the outside is applied to the multifunction peripheral 100 or to the image reading device 1. The read control unit 50 can detect whether or not the carriage 7 has moved at a resolution of one line (one step of the stepping motor 53).

When the movement of the carriage 7 is detected (Step #2, Yes), the read control unit 50 determines that phase adjustment is required (Step #3). The read control unit 50 performs phase adjustment (Step #4). Here, the read control unit 50 magnetically excites a coil of the stepping motor 53. By the phase adjustment, the rotation angle of the rotor and the angle of magnetic excitation are made equal. Thus, the rotation of the stepping motor 53 can be started without going out of synchronism.

After the phase adjustment, the read control unit 50 places the carriage 7 again at the home position (Step #5). More specifically, the read control unit 50 rotates the stepping motor 53. The read control unit 50 moves the carriage 7 from the home position toward the optical sensor 56. When the optical sensor 56 is arranged between the placement-reading contact glass 52 and the feed-reading contact glass 51 and when the home position is arranged to the placement-reading contact glass 52 side of the optical sensor 56, the read control unit 50 moves the carriage 7 from the placement-reading contact glass 52 side toward the optical sensor 56 (to the left). With the light intercepted by the light shielding plate 74, the read control unit 50 recognizes that the level of the output signal S1 is kept at the second level (High level) for a predetermined time. Thereafter, the read control unit 50 moves the carriage 7 the predetermined number of steps toward the home position. Then, the read control unit 50 stops the stepping motor 53 such that the carriage 7 is located at the home position. After Step #5, the flow returns to Step #1.

When no movement of the carriage 7 is detected (when the carriage 7 has not moved; Step #2, No), the read control unit 50 determines that no phase adjustment is required (Step #6). Then, the read control unit 50 checks whether or not it is necessary to start a job involving document reading (Step #7). For example, the read control unit 50 checks whether or not an instruction to start a scan job is entered on the operation panel 4.

When a job involving document reading is started (Step #7, Yes), the read control unit 50 starts the rotation of the stepping motor 53 without phase adjustment (Step #8). The carriage 7 is kept in a state with no deviation from the home position. When the carriage 7 is at rest, the stepping motor 53 is in the magnetically unexcited state. Even in the magnetically unexcited state, it is possible to immediately start the rotation of the stepping motor 53 without phase adjustment.

After the start of the rotation of the stepping motor 53, the read control unit 50 places the carriage 7 at a read position. There, reading by the image sensor 73 is started (Step #9). Then the flow ends (End). After completion of reading, the carriage 7 returns to the home position, then the flow starts.

As described above, the image reading device 1 includes a stepping motor 53, an optical sensor 56, a carriage 7, a moving portion 8, a pulse generating mechanism 9, and a control portion (read control unit 50). The optical sensor 56 includes a light emitting portion 56L and a light receiving portion 56R. The light receiving portion 56R is arranged at a distance from a light emission surface of the light emitting portion 56L and outputs an output signal S1. The carriage 7 includes at least a lamp 71 which radiates light toward a document. The moving portion 8 includes an endless belt 81, a driving gear 82 and a driven gear 83, and a first transmission gear 84. Around the driving gear 82 and the driven gear 83, the belt 81 is wound. Via the first transmission gear 84, a drive of the stepping motor 53 is transmitted to the driving gear 82 to rotate the belt 81. The moving portion 8 moves the carriage 7 fitted to the belt 81 in the sub-scanning direction by the rotation of the driving gear 82. The pulse generating mechanism 9 includes a second transmission gear 92 and a pulse generating gear 91. The second transmission gear 92 meshes with a rotary shaft 53a of the stepping motor 53 or with one of the gears of the moving portion 8. The pulse generating gear 91 rotates based on a driving force of the second transmission gear 92. The pulse generating gear 91 is provided with a plurality of light shielding teeth 93 along its circumference. The light receiving portion 56R outputs the output signal S1 at a first level when light from the light emitting portion is not intercepted. The light receiving portion 56R outputs the output signal S1 at a second level when the light is intercepted. The carriage 7 is provided with a light shielding plate 74 which passes through a gap 57 between the light emitting portion 56L and the light receiving portion 56R and which, while passing therethrough, shields the optical path from the light emitting portion 56L to the light receiving portion 56R. The light shielding teeth 93 of the pulse generating gear 91 pass through the gap 57. The pulse generating gear 91 is arranged at a position at which the pulse generating gear 91, while rotating, alternately transmits and intercepts light along the optical path with the light shielding teeth 93. A first width W1 and a second width W2 are set such that a movement amount of the pulse generating gear 91 resulting from the stepping motor 53 rotating one step is equal to or larger than both the first width W1 and the second width W2. The first width W1 is a width of each of the light shielding teeth 93 in a rotation direction of the pulse generating gear 91. The second width W2 is a width of an interval between adjacent light shielding teeth 93 in the rotation direction of the pulse generating gear 91. The control portion keeps the carriage 7 on standby at a home position which is a position at which the light shielding plate 74 does not shield the optical path. The control portion recognizes a deviation in the position of the carriage 7 when, during standby of the carriage 7 at the home position, the level of the output signal S1 changes. The control portion determines whether or not phase adjustment of the stepping motor 53 is required based on the recognition.

Thus, it is possible to detect a deviation in the position of the carriage 7 in the standby state. The precision is equal to or smaller than the amount of movement of the carriage 7 corresponding to one step of the stepping motor 53. It is possible to precisely detect whether or not there is a deviation in the position of the carriage 7 on standby at the home position. Thus, the need for phase adjustment of the stepping motor 53 can be appropriately determined. Thus, unlike in the conventional case, it is unnecessary to perform phase adjustment of the stepping motor 53 every time its rotation is started. Only when the position of the carriage 7 is one or more steps deviated, it can be determined that phase adjustment is necessary. Thus, at the start of rotation, no time is needed for phase adjustment. When the position of the carriage 7 is one or more steps deviated, phase adjustment is performed. Thus, the stepping motor 53 does not go out of synchronism.

The control portion brings the stepping motor 53 into a magnetically unexcited state during standby at the home position. The control portion starts the rotation of the stepping motor 53 without phase adjustment when no deviation in the position of the carriage 7 is detected after the carriage 7 is located at the home position until the rotation of the stepping motor 53 is started. Unlike in the conventional case, the stepping motor 53 is not magnetically excited (holding torque is applied instead) not to move the carriage 7. This helps reduce power consumption of the stepping motor 53 on standby. Without going out of synchronism, the rotation of the stepping motor 53 can be started promptly.

When a deviation in the position of the carriage 7 is detected after the carriage 7 is located at the home position until the rotation of the stepping motor 53 is started, the control portion performs phase adjustment of the stepping motor 53. The control portion stops the carriage 7 again at the home position. This makes it possible to keep the carriage 7 at an accurate position (home position) with no deviation from the home position. Thus, it is possible to locate the position of the carriage 7 at an accurate position for document reading. Thus, it is possible to read a document with no deviation.

The light shielding teeth 93 are formed such that the first width W1 and the second width W2 are equal. The first width W1 and the second width W2 are set such that the movement amount of the pulse generating gear 91 resulting from the stepping motor 53 rotating one step is equal to the first width W1 and the second width W2. This makes it possible to change the output signal S1 once when the stepping motor 53 rotates one step. Thus, it is possible to detect a deviation in the position of the carriage 7 with the precision of the movement amount corresponding to one step.

When the carriage 7 is stopped at the home position, the control portion moves the carriage 7 toward the installation position of the optical sensor 56. When the output signal S1 is kept at the second level for a predetermined time by the light shielding plate 74 shielding the optical path, the control portion recognizes that the light along the optical path is intercepted by the light shielding plate 74. By moving the carriage 7 a predetermined number of steps from a time point of the recognition of the light intercepted by the light shielding plate 74, the control portion stops the carriage 7 at the home position. When the carriage 7 is located at the home position, the light shielding plate 74 does not shield the optical path. Thus, it is possible to accurately and precisely detect a deviation in the position of the carriage 7 based on the rotation of the pulse generating gear 91 (changes in the level of the output signal S1).

The image reading device 1 further includes a motor gear 53b fitted around the rotary shaft 53a of the stepping motor 53. The first transmission gear 84 comprises a plurality of first transmission gears 84. One of the first transmission gears 84 meshes with the motor gear 53b. Another one of the first transmission gears 84 meshes with the driving gear 82. Thus, a driving force is transmitted from the stepping motor 53 via the plurality of gears to the driving gear 82. By adjusting the number of cogs of the gears, it is possible to flexibly set the movement amount of the carriage 7 resulting from the stepping motor 53 rotating one step.

The second transmission gear 92 comprises a plurality of second transmission gears 92. One of the second transmission gears 92 meshes with the motor gear 53b. Another one of the second transmission gears 92 meshes with the pulse generating gear 91. Thus, a driving force is transmitted from the stepping motor 53 via the plurality of gears to the pulse generating gear 91. By adjusting the number of cogs of the gears, it is possible to flexibly set the rotation amount of the pulse generating gear 91 resulting from the stepping motor 53 rotating one step.

An image forming apparatus includes the image reading device 1 described above and a printing unit 3 which performs printing based on image data acquired by reading by the image reading device 1. It is possible to provide an image forming apparatus that can precisely detect a deviation in the position of the carriage 7. It is also possible to provide an image forming apparatus that, when no deviation is detected, skips phase adjustment of the stepping motor 53 and thus requires little time to start the rotation.

While some embodiments of the present disclosure have been described above, they are in no way meant to limit the scope of the present disclosure, which thus allows for many modifications and variations within the spirit of the present disclosure.

What is claimed is:

1. An image reading device comprising:
   a stepping motor;
   an optical sensor including a light emitting portion and a light receiving portion, the light receiving portion being arranged at a distance from a light emission surface of the light emitting portion and outputting an output signal;
   a carriage including at least a lamp which radiates light toward a document;
   a moving portion including an endless belt, a driving gear and a driven gear around which the belt is wound, and a first transmission gear via which a drive of the stepping motor is transmitted to the driving gear to rotate the belt, the moving portion moving the carriage fitted to the belt in a sub-scanning direction by rotation of the driving gear;
   a pulse generating mechanism including a second transmission gear which meshes with a rotary shaft of the stepping motor or with one of the gears of the moving portion, and a pulse generating gear which rotates based on a driving force of the second transmission gear and which is provided with a plurality of light shielding teeth along a circumference thereof; and a control portion which controls rotation and magnetic excitation of the stepping motor, the control portion receiving the output signal, wherein the light receiving portion outputs the output signal at a first level when light from the light emitting portion is not intercepted, and outputs the output signal at a second level when the light is intercepted, the carriage is provided with a light shielding plate which passes through a gap between the light emitting portion and the light receiving portion and which, while passing therethrough, shields an optical path from the light emitting portion to the light receiving portion, the light shielding teeth of the pulse generating gear pass through the gap, the pulse generating gear is arranged at a position at which the pulse generating gear, while rotating, alternately transmits and intercepts light along the optical path with the light shielding teeth, a first width and a second width are set such that a movement amount of the pulse generating gear resulting from the stepping motor rotating one step is equal to or larger than both the first width and the second width, the first width is a width of each of the light shielding teeth in a rotation direction of the pulse generating gear, the second width is a width of an interval between adjacent light shielding teeth in the rotation direction of the pulse generating gear, and the control portion
  keeps the carriage on standby at a home position which is a position at which the light shielding plate does not shield the optical path,
  recognizes a deviation in a position of the carriage when, during standby of the carriage at the home position, a level of the output signal changes, and
  determines whether or not phase adjustment of the stepping motor is required based on the recognition.

2. The image reading device of claim 1, wherein
the control portion
  brings the stepping motor into a magnetically unexcited state during the standby at the home position, and
  starts the rotation of the stepping motor without phase adjustment when no deviation in the position of the carriage is detected after the carriage is located at the home position until the rotation of the stepping motor is started.

3. The image reading device of claim 2, wherein
when a deviation in the position of the carriage is detected after the carriage is located at the home position until the rotation of the stepping motor is started,
the control portion performs phase adjustment of the stepping motor and stops the carriage again at the home position.

4. The image reading device of claim 1, wherein
the light shielding teeth are formed such that the first width and the second width are equal, and
the first width and the second width are set such that the movement amount of the pulse generating gear resulting from the stepping motor rotating one step is equal to the first width and the second width.

5. The image reading device of claim 1, wherein
when the carriage is stopped at the home position,
the control portion moves the carriage toward an installation position of the optical sensor, and
when the output signal is kept at the second level for a predetermined time by the light shielding plate shielding the optical path,
the control portion recognizes that the light along the optical path is intercepted by the light shielding plate, and stops the carriage at the home position by moving the carriage a predetermined number of steps from a time point of the recognition of the light intercepted by the light shielding plate.

6. The image reading device of claim 1, further comprising:
a motor gear fitted around the rotary shaft of the stepping motor, wherein
the first transmission gear comprises a plurality of first transmission gears, one of the first transmission gears meshes with the motor gear, and
another one of the first transmission gears meshes with the driving gear.

7. The image reading device of claim 6, wherein
the second transmission gear comprises a plurality of second transmission gears, one of the second transmission gears meshes with the motor gear, and
another one of the second transmission gears meshes with the pulse generating gear.

8. An image forming apparatus comprising:
the image reading device of claim 1; and
a printing unit which performs printing based on image data acquired by reading by the image reading device.

9. A method for controlling an image reading device, comprising:
providing an optical sensor including a light emitting portion and a light receiving portion, the light receiving portion being arranged at a distance from a light emission surface of the light emitting portion and outputting an output signal;
radiating light toward a document with a lamp provided in a carriage;
rotating an endless belt by transmitting, via a first transmission gear, a drive of a stepping motor to a driving gear around which the belt is wound;
moving the carriage fitted to the belt in a sub-scanning direction by rotation of the driving gear;
meshing a second transmission gear with a rotary shaft of the stepping motor or with one of the gears of a moving portion;
rotating, based on a driving force of the second transmission gear, a pulse generating gear provided with a plurality of light shielding teeth along a circumference thereof;
controlling rotation and magnetic excitation of the stepping motor;
making the light receiving portion output the output signal at a first level when light from the light emitting portion is not intercepted and output the output signal at a second level when the light is intercepted;
providing in the carriage a light shielding plate which passes through a gap between the light emitting portion and the light receiving portion and which, while passing therethrough, shields an optical path from the light emitting portion to the light receiving portion;
arranging the pulse generating gear at a position at which the pulse generating gear, while rotating, alternately transmits and intercepts light along the optical path with the light shielding teeth by the light shielding teeth passing through the gap;
setting a first width and a second width such that a movement amount of the pulse generating gear resulting from the stepping motor rotating one step is equal to or larger than both the first width and the second width, the first width is a width of each of the light shielding teeth in a rotation direction of the pulse generating gear, the second width is a width of an interval between adjacent light shielding teeth in the rotation direction of the pulse generating gear, keeping the carriage on standby at a home position which is a position at which the light shielding plate does not shield the optical path;

recognizing a deviation in a position of the carriage when, during standby of the carriage at the home position, a level of the output signal changes; and determining whether or not phase adjustment of the stepping motor is required based on the recognition.

* * * * *